(12) United States Patent
Nakajima et al.

(10) Patent No.: US 6,198,862 B1
(45) Date of Patent: Mar. 6, 2001

(54) OPTICAL POSITION DETECTOR

(75) Inventors: Hajime Nakajima, Tokyo (JP); Patrick Ruther, Karlsruhe (DE)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/567,091

(22) Filed: May 8, 2000

Related U.S. Application Data

(63) Continuation of application No. PCT/JP98/04144, filed on Sep. 16, 1998.

(51) Int. Cl.[7] .............................. G02B 6/32; G02B 6/26
(52) U.S. Cl. .................................. 385/33; 385/39; 385/14
(58) Field of Search ................................ 385/31, 33, 49, 385/129, 14; 356/375

(56) References Cited

U.S. PATENT DOCUMENTS 5,418,765 * 5/1995 Misawa et al. .................. 369/44.12

FOREIGN PATENT DOCUMENTS

| 361072218A | * | 4/1986 | (JP) | .............................. G02B/27/00 |
|---|---|---|---|---|
| 1-115156 | | 5/1989 | (JP) . | |
| 1-124788 | | 5/1989 | (JP) . | |
| 10-9813 | | 1/1998 | (JP) . | |

OTHER PUBLICATIONS

"Needs And Seeds In Optical Measurement", Corona Inc. pp. 202–203.

* cited by examiner

Primary Examiner—Frank G. Font
Assistant Examiner—Layla G. Lauchman
(74) Attorney, Agent, or Firm—Leydig, Voit & Mayer, Ltd.

(57) ABSTRACT

An optical position detector having an excellent detection characteristic at long measurement distance is achieved by a structure including an input optical fiber, output optical fibers, a slab light guide which is disposed on a substrate and has a branched light guide, a first cylindrical lens which converts an optical path of light emerging from the slab light guide and which condenses the light on a surface to be detected, and a second cylindrical lens which converts an optical path of light reflected from the surface to be detected and which guides the light to the slab light guide.

3 Claims, 4 Drawing Sheets

OPTICAL POSITION DETECTOR

CROSS-REFERENCE TO THE RELATED APPLICATION

This is a continuation of copending application International Application No. PCT/JP98/04144, filed Sep. 16, 1998, and which designates the U.S.

BACKGROUND OF THE INVENTION

1. Field of the Invention

The present invention relates to an optical position detector which detects a position by using a triangulation method.

2. Description of the Prior Art

Conventionally, optical position detectors have widely used a triangulation method Due to the low cost and simple structure, they have wide application as sensors for camera auto-focusing. FIG. 5 shows a position detection method by triangulation in a conventional optical position detector as disclosed, for example, in the publication "Needs and Seeds of Optical Instrumentation" (P.167) by the Study and survey Committee for Optically Applied Measuring Technology, the Society of Weights and Measures. In FIG. 5, reference numeral 101 denotes a light source such as a laser which emits a parallel beam, and the light source is not provided with a lens for light projection. 102 is an image formation lens, 103 is a position detection element (for example PSD (position sensitive device) or the like). In this optical position detector, either the image pickup system is oblique to the displacement direction of the detected surface 104 or the incident direction of light is inclined against the displacement direction.

The operation of the conventional optical position detector will now be explained.

When the detected surface 104 is displaced from a reference position, the prospect angle with respect to the image formation lens 102 of the spot on the detected surface 104 varies. Since the image position on the position detecting element 103 varies in response to the variation of the prospect angle, the position of the detected surface 104 can be calculated.

Since conventional optical position detectors are constructed as above, when a compact semiconductor laser is used as a light source, a collimator lens must be provided, and when the light source 101 is a gas laser, the laser size must be inherently large though a lens system is not necessary. In other words, in the conventional optical position detector using a triangulation method, since a general image forming lens 102 is used for convergence of light and image formation, there is a limit to the degree to which the device can be miniaturized Furthermore, an optical position detector which uses a bar shaped lens having uni-axial focussing operation and an optical fiber as an optical guide is disclosed, for example, in the publication JP-A 10-9813. However, the optical position detector also has a problem that there is a limit to the degree to which the device can be miniaturized, if it is required to obtain an excellent detection characteristic at long measurement distance.

SUMMARY OF THE INVENTION

The present invention is proposed to solve the above problems and has an object of providing a compact optical position detector with an excellent detection characteristic even at long measurement distance.

According to the present invention, an optical position detector comprises an input optical fiber, an output optical fiber, a slab light guide disposed on a substrate and having a branched light guide, a first cylindrical lens disposed adjacent to the slab light guide for converting an optical path of light emitted from the slab light guide and for condensing the light on the detected surface, and a second cylindrical lens disposed adjacent to the slab light guide for converting an optical path of light reflected from the detected surface and for guiding such the light to the slab light guide.

In this way, it is possible to obtain an optical position detector having an excellent detection characteristic even at long measurement distance.

The optical position detector of the present invention further comprises a lens positioning piece provided on the slab light guide for positioning the first and second cylindrical lenses.

In this way, it is possible to easily position the first and second cylindrical lenses.

In the present invention, the slab light guide is provided with a light guiding structure which is adapted to the core and cladding layers of the input and output optical fibers and which is manufactured by a thick film resist lithography process.

Thus, mass manufacture of the optical position detectors having fine structure is possible.

DETAILED DESCRIPTION OF THE PREFERRED EMBODIMENT

The preferred embodiments of the invention are explained in detail below with reference to the accompanying FIGS.

Embodiment 1

Figure 1:
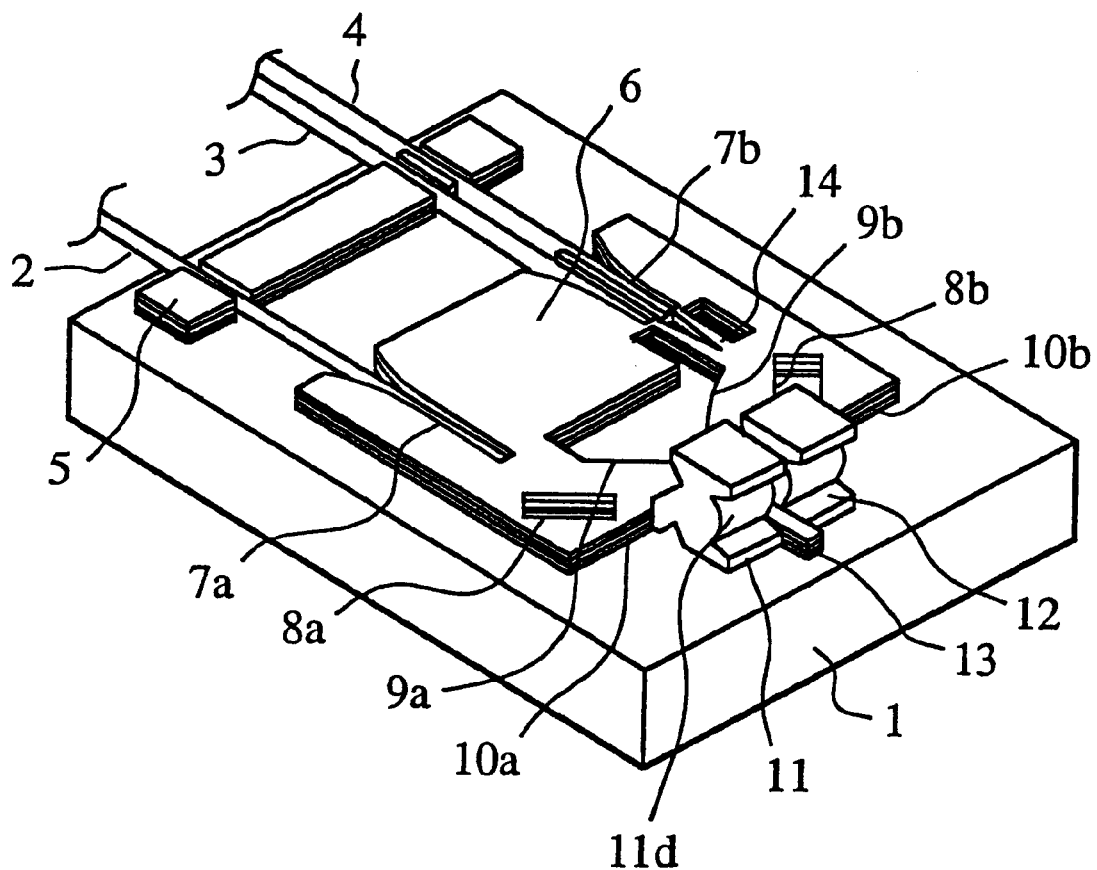
FIG. 1 is a perspective view of an optical position detector according to a first embodiment of the present invention.
Figure 2:
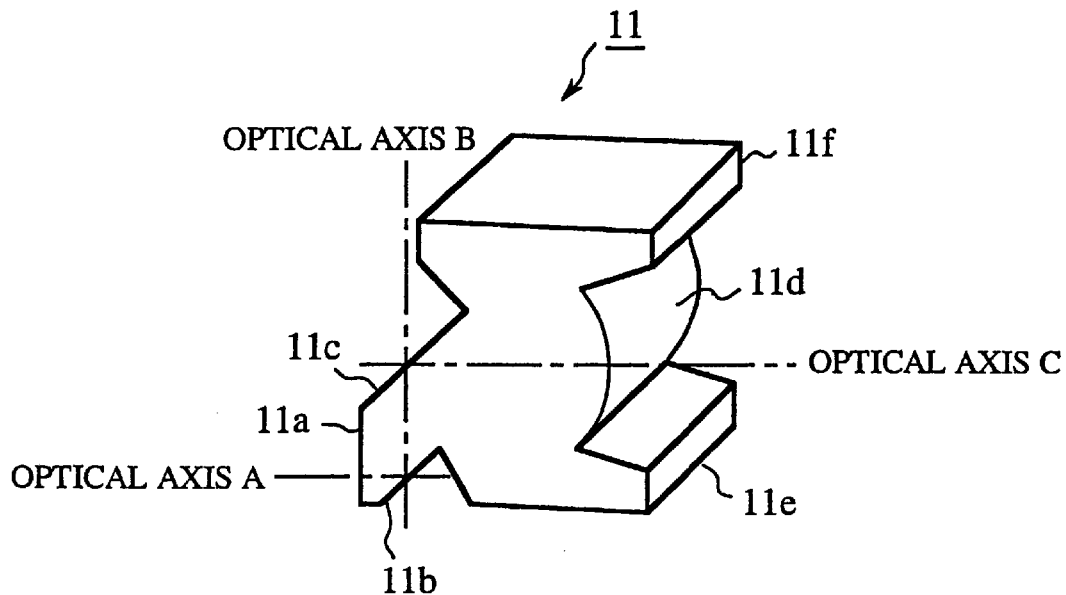
FIG. 2 is a perspective view of a cylindrical lens.
Figure 5:
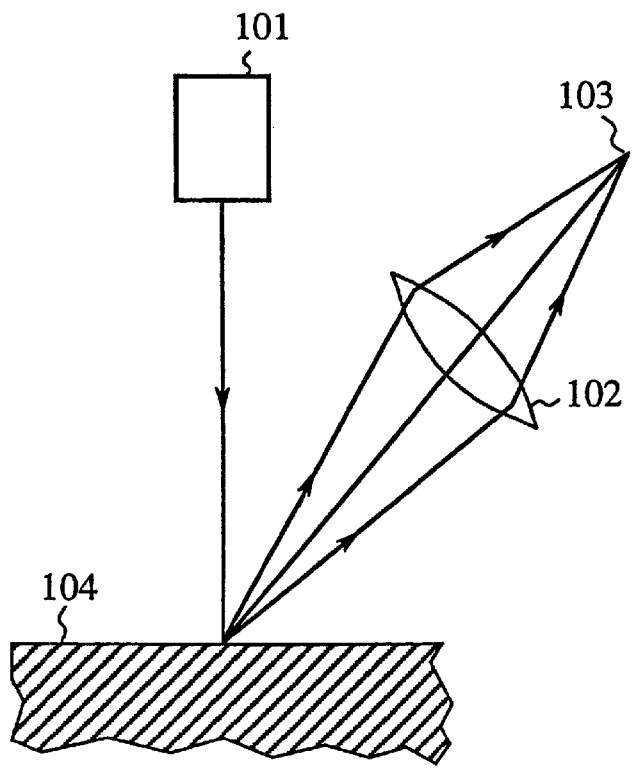
FIG. 5 explains the position detection method and the basis of the triangulation method used in a conventional optical position detector.
Figure 3:
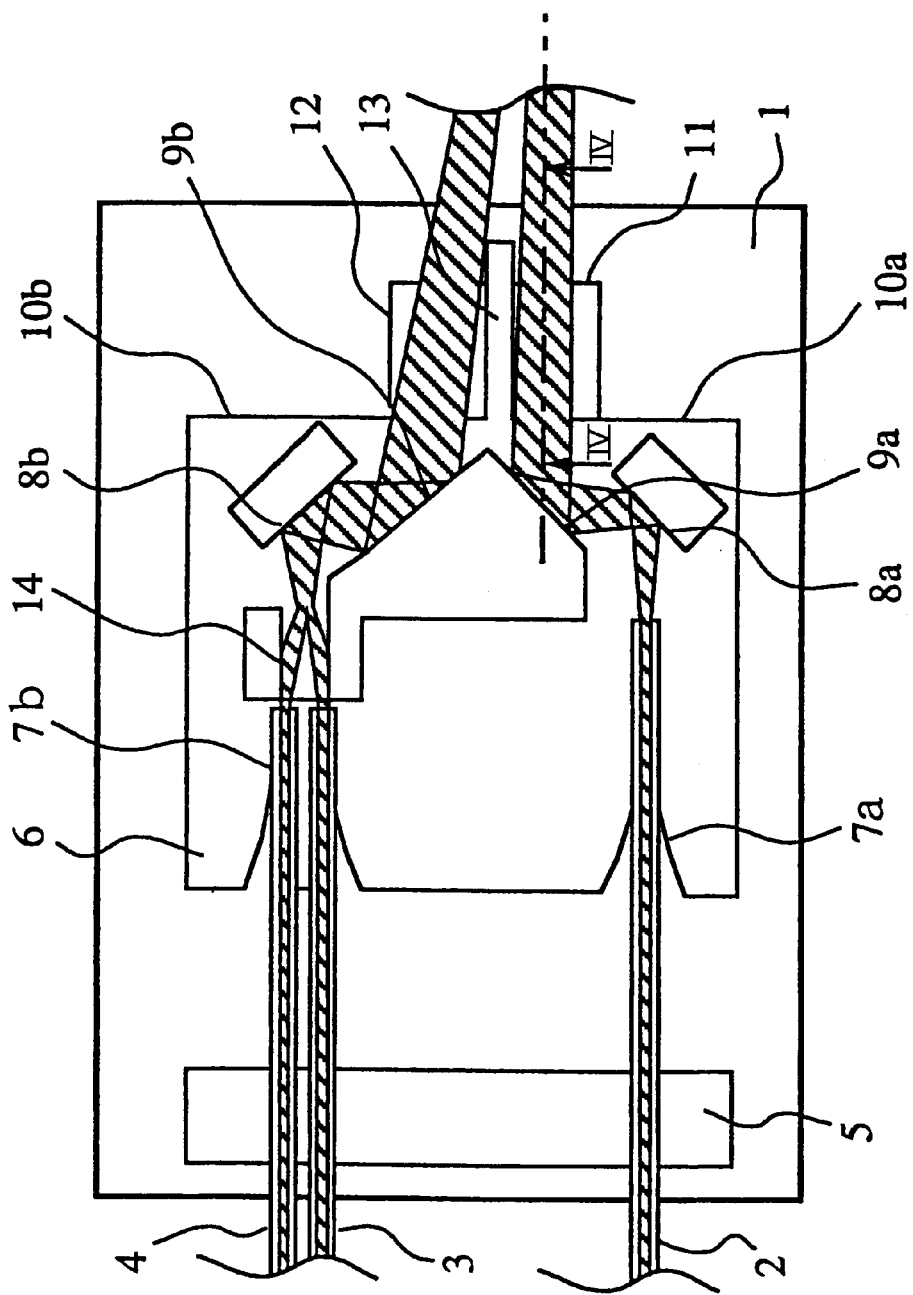
FIG. 3 is a plan view of an optical position detector.
Figure 4:
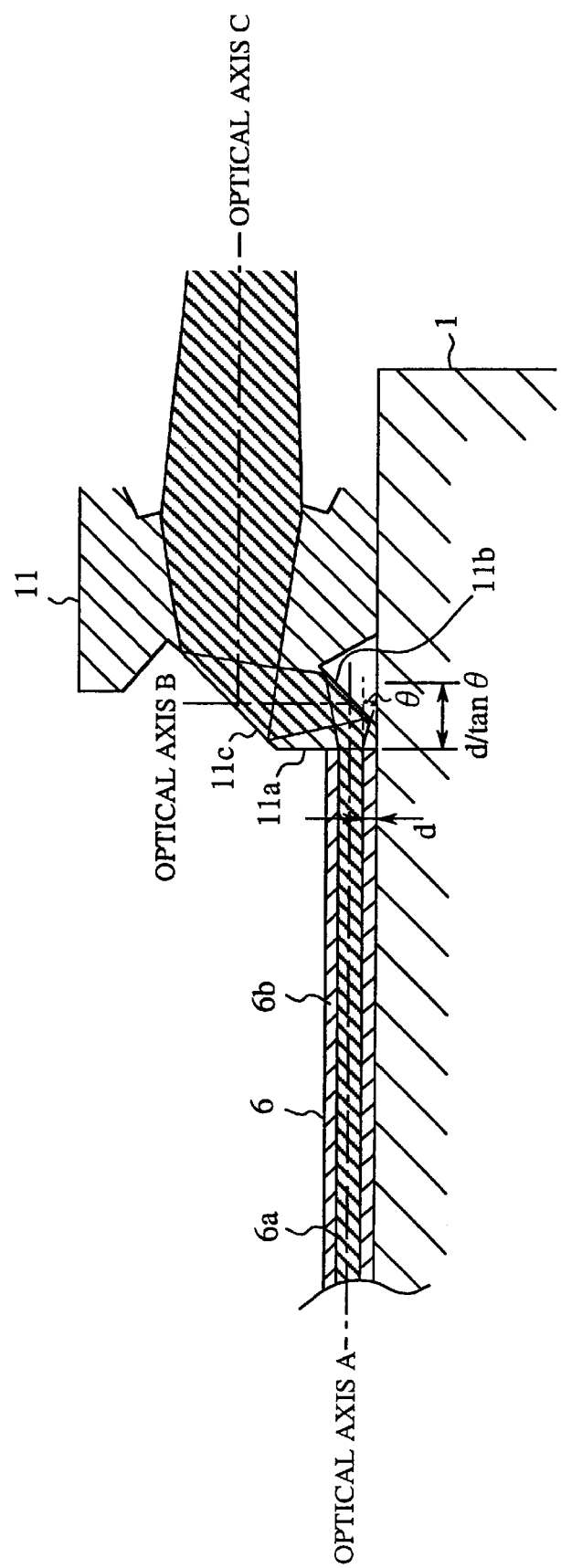
FIG. 4 is a cross sectional view along line IV—IV of FIG. 3.

FIG. 1 is a perspective view showing an optical position detector according to a first embodiment of the present invention. FIG. 2 is a perspective view showing a cylindrical lens, FIG. 3 is a plan view of the optical positional detector, and FIG. 4 is a cross sectional view along line IV—IV of FIG. 3.

In the FIGS., reference numeral 1 denotes a substrate, 2 is an input optical fiber, 3 and 4 are output optical fibers, 5 is an optical fiber support (guiding means), 6 is a slab light guide which is formed by sandwiching a core layer 6a with cladding layers 6b having a refractive index slightly lower than the core layer 6a. The slab light guide 6 is formed of transparent resin. The thickness of the core layer 6a. The cladding layers 6b is set to correspond with the core diameter and dad thickness of the input optical fiber 2. represents the thickness of the cladding layers 6b, θ is the spread angle of the incident light beam entering an incidence plane 11a (discussed below) from the end face of the slab light guide 6 and is represented by numerical aperture (NA) of the slab light guide 6.

7a, 7b are guiding grooves (guiding means) of the optical fibers 2, 3, 4, which consist of sidewalls of the slab light guide 6. 8a is a first light guide sidewall mirror consisting of the sidewall of the slab light guide 6. The first light guide sidewall mirror 8a is oriented so that the guided light from the input optical fiber 2 undergoes total internal reflection or, for example, is formed by applying a coating of a metal having a high reflectivity such as silver. 8b is a second light guide sidewall mirror consisting of the sidewall of the slab light guide 6. 9a is a first concave mirror which consists of the sidewall of the slab light guide 6 and which has a curved surface. The curved surface of the first concave mirror 9a is set in such a manner that the guided light from the input optical fiber 2 is converted, toward the substrate plane, into convergent light having a focal point at a predetermined position on a predetermined optical axis on the outside of the slab light guide 6. 9b is a second concave mirror which consists of the sidewall of the slab light guide 6 and which has a curved surface. The inclination angle and curvature of the second concave mirror 9b is set in such a manner that when the surface to be detected, which is not shown in the FIG., is in a predetermined position, the image of the light spot on the detected surface is formed on the branching point of the branched light guide 14 discussed below. 10a is a first lens joining end face consisting of the sidewall of the slab light guide 6, 10b is a second lens joining end face consisting of the sidewall of the slab light guide 6.

11 is a first cylindrical lens which will be explained in detail based on FIGS. 2 and 4. In FIGS. 2 and 4, A, B, C are optical axes. Axis A is orthogonal to axis B and axis B is orthogonal to axis C. 11a is an incidence plane of the light and may also be an emergence plane of light. 11b is a first internal reflection mirror which converts light along the optical axis A into light along the optical axis B. 11c is a second internal reflection mirror which converts light along the optical axis B into light along the optical axis C. 11d is a cylindrical lens surface which converges the guided light on the optical axis C and also functions as a light incidence plane. 11e, 11f are lens protectors which are respectively provided on the top and bottom sections in order to prevent the lens surface from damage during the mounting procedure of the first cylindrical lens 11.

The formation position of the first internal reflection mirror 11b will now be explained.

When a first internal reflection mirror 11b is not present, as shown in FIG. 4, light emerging from the slab light guide 6 and entering the incidence plane 11a is cut off by the substrate 1 at a position separated by d/tan θ from the incidence plane 11a. Therefore, the first internal reflection mirror 11b is located at a position where optical axis A of the incident light from the incidence plane 11a can be converted into optical axis B before being cut off by the substrate 1. Furthermore, the second internal reflection mirror 11c is located at a position where the optical axis B of the light reflected from the first internal reflection mirror 11b can be converted into optical axis C. The cylindrical lens surface 11d has an optical axis corresponding with the optical axis C and so that an incident light is converted into a convergent light having a focal point at the predetermined position on the optical axis C.

The size and focal distance of the first cylindrical lens is determined by the converged position and the size of the converged light spot required beam after emergence.

12 is a second cylindrical lens for introducing the light reflected from the detected surface (not shown), which will be discussed below, to a second lens joining end face 10b. 13 is a lens positioning piece which is a part of the slab light guide 6 and which positions the cylindrical lenses 11 and 12. 14 is a branched light guide.

A surface to be detected (not shown), which is the object of the distance measurement, is disposed in the outgoing direction of light from the first cylindrical lens 11. Also, a light detection means (not shown) is disposed at the output end of the output optical fibers 3 and 4.

A method of manufacturing an optical position detector of the present invention will be explained below.

The present invention allows mass manufacture of the optical position detector with fine structure by the application of a thick film resist lithography technique. It is possible to apply the process known by the name of LIGA (which is an acronym of the German terms for lithography, electro-forming and molding) in which exposure using X rays is most appropriate for accurate exposure of a thick film resist. The constituting materials have to be transparent over the wavelength of the light used. As the constituting materials, glass, polymer or various materials may be used. One example will be discussed hereafter.

A ceramic material may, for example, be used for a substrate, on the surface of which a polymer for light guide, for example, PMMA (Polymethyl methacrylate) is laminated in three layers of differing refractive indexes. The thickness and reactive index of the polymer are selected so that as a light guide, incidence of light on the optical fiber is efficient. The laminated polymer film is patterned, for example, by X ray lithography and the slab light guide 2, the optical fiber support 5, the guide grooves 7a, 7b and the lens positioning piece 13 are formed together. Thereafter, the cylindrical lenses 11 and 12 and the optical fibers 2, 3, 4 are mounted in predetermined positions and the optical position detector is completed.

The operation of the optical position detector will now be explained.

As shown in FIGS. 3 and 4, the light introduced into the slab light guide 6 from the input optical fiber 2 is confined in the slab light guide 6 with respect to the thickness direction thereof, propagates divergently according to the numerical aperture of the input optical fiber, in a direction parallel to the surface of the substrate 1 and arrives at the first light guide sidewall mirror 8a.

The light reflected from the first light guide sidewall mirror 8a converts its optical path, while being confined in the slab light guide 6, and is reflected again by the first concave mirror 9a. The reflected light from the first concave mirror 9a emerges from the first lens joining end face 10a and enters the incidence plane 11a of the first cylindrical lens 11.

The incident light on the first cylindrical lens 11 is reflected by the internal reflection mirrors 11b, 11c while diverging, changes its light path direction, and arrives at the cylindrical lens surface 11d. Then, it is converged and output towards the surface to be detected (not shown). In other words, without limiting the height of the slab light guide 6, it is possible to convert an optical axis A of the output light to axes B, C and thus to form a narrow beam towards the detected surface disposed at the far end of the slab light guide 6.

The light beam reflected from the detected surface enters the cylindrical lens surface of the second cylindrical lens 12, emerges from its incidence plane and is again introduced into the slab light guide 6 from the second lens joining end face 10b. The introduced light beam is reflected by the second concave mirror 9b and the second light guide sidewall mirror 8b and directed towards the branched light guide 14. After being isolated into respective branched light guides in accordance with the image forming positions, the light beam at the branching paint of the branched light guide 14 is coupled with the output optical fibers 3 and 4 taken out to the exterior.

The image of the light spot observed at the branching point of the branched light guides is observed at a position which is inclined reflective to the optical axis C of the light beam emerging from the first cylindrical lens 11. Thus, the position of the light spot image at the branching point varies in response to the variation in the distance between the detected surface and the optical position detector. Thus, the ratio of the light quantity coupled with the output optical fibers 3 and 4 varies. It is possible to detect the distance between the detected surface and the optical position detector by measuring this variation with a photo detector (not shown) which is coupled with the output end of the output optical fibers 3 and 4.

As shown above, according to embodiment 1, the provision of an optical position detector which has an excellent detection characteristic at long measurement distance is possible due to a structure provided with a cylindrical lens 11 which can convert incident diffusing light into a light beam having sufficient narrowness over a desired measurement range.

The position or the cylindrical lens may be easily determined by the provision of a lens positioning piece 13.

Furthermore, the mass production of optical position detectors having fine structure is possible due to the use of a lithography process.

As shown above, the optical position detector of the present invention is useful with an autofocusing sensor for a compact camera or the like which requires an excellent detection characteristic at a long measurement distance.

What is claimed is:

1. An optical position detector comprising:

a substrate;

an input optical fiber disposed in a fixed position on the substrate by a guide for introducing light from an external light source;

output optical fibers disposed in a fixed position on the substrate by the guide for outputting the light to an external optical detection means;

a slab light guide disposed on the substrate for supporting and guiding said input optical fiber and said output optical fibers, for diverting an optical path of light output from said input optical fiber and for outputting the light, said slab light guide further diverting an optical path of light reflected from a surface to be detected and guiding the light reflected to the output optical fibers through a branched light guide;

a first cylindrical lens disposed adjacent to said slab light guide for diverting an optical path of light output from said slab light guide and for condensing the light on the surface to be detected; and a second cylindrical lens disposed adjacent to said slab light guide for diverting the optical path of light reflected from the surface to be detected and guiding the light reflected from the surface to be detected to said slab light guide.

2. The optical position detector as claimed in claim 1, wherein said slab light guide includes a lens positioning piece for positioning said first cylindrical lens and said second cylindrical lens.

3. The optical position detector as claimed in claim 1, wherein said slab light guide includes a light guiding structure adapted to cores and cladding layers of said input and output optical fibers, the light guiding structure being manufactured by a thick film resist lithography process.

* * * * *